Jan. 2, 1934.  J. T. CATLETT  1,942,047
ARC WELDING
Filed June 21, 1932
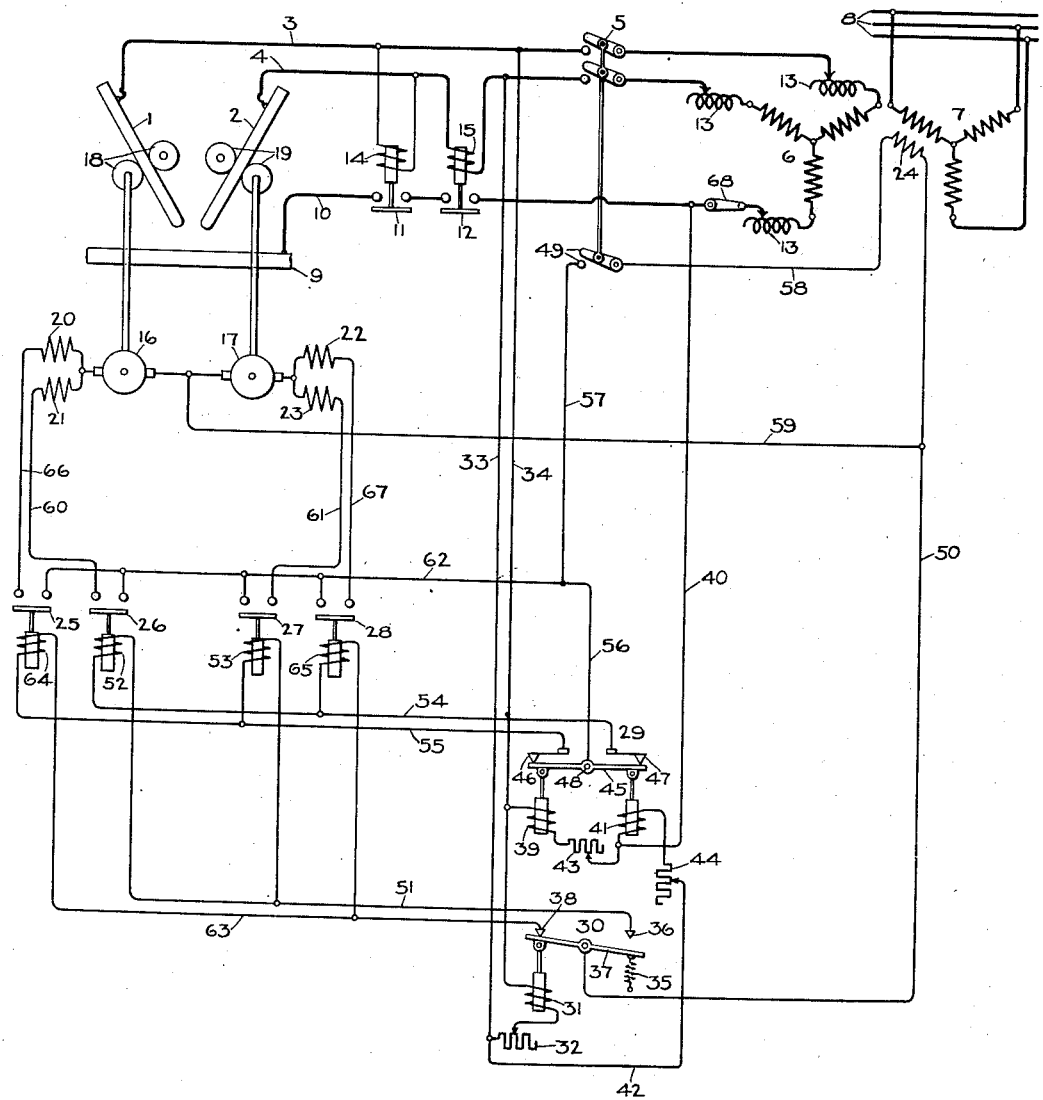
Inventor:
James T. Catlett,
by Chas. E. Tullar
His Attorney.

Patented Jan. 2, 1934

1,942,047

UNITED STATES PATENT OFFICE 1,942,047

ARC WELDING

James T. Catlett, Scotia, N. Y., assignor to General Electric Company, a corporation of New York Application June 21, 1932. Serial No. 618,450

10 Claims. (Cl. 219—8)

My invention relates to arc welding, and more particularly to that form of arc welding in which the electrodes and the work are connected in a polyphase circuit.

It is an object of my invention to provide means for automatically maintaining a predetermined voltage between the electrodes while at the same time maintaining a predetermined relationship between the voltages between each electrode and the work.

It is also an object of my invention to provide means for establishing an arc between the electrodes prior to connecting the work in the welding circuit.

Further objects of my invention will become apparent from the following description taken in connection with the accompanying drawing which diagrammatically represents one embodiment thereof.

In the single figure of the drawing electrodes 1 and 2 are connected through conductors 3 and 4 and a switch 5 to two phases of the secondary 6 of a polyphase transformer whose primary 7 is connected to a source of supply 8. The work 9 is connected through a conductor 10 and switches 11 and 12 to the other phase of the transformer. Adjustable reactances 13 are connected in each of these circuits for stabilizing the action of the arc maintained between the electrodes and the work.

Switch 11 is operated by an electromagnet whose coil 14 is connected across electrodes 1 and 2 so as to be responsive to the voltage between these electrodes, and switch 12 is operated by an electromagnet whose coil 15 is connected in series with the circuit through electrodes 1 and 2. The arrangement of switches 11 and 12 is such that upon establishment of an arc between electrodes 1 and 2 both switches are closed, connecting the work into the welding circuit. By employing this arrangement dangerous voltages between the electrodes and the work are eliminated, thus avoiding undue danger to the operator. The phase which is connected to the work may be designed for a low voltage but this is rarely necessary as the voltage between the electrodes and the work after the arc has started is much lower than the open circuit voltage.

In the arrangement illustrated electrodes 1 and 2 are inclined relative to one another and the work so that when they are fed toward one another they are also fed toward the work, and when fed away from one another they are also fed away from the work. The feeding operation of each electrode is under the control of motors 16 and 17. Feed motor 16 is connected through a transmission including feed rolls 18 to electrode 1 and feed motor 17 is connected through a transmission including feed rolls 19 to electrode 2. Motor 16 is provided with two field windings 20 and 21 and motor 17 is provided with two field windings 22 and 23. When these motors are energized through their fields 20 and 22 their rotation is in the proper direction to separate the electrodes from one another and the work and when energized through their field windings 21 and 23 their rotation is in the proper direction to feed the electrodes toward one another and the work. These feed motors are connected to a source of supply 24, shown as an auxiliary winding associated with welding transformers through switches 25, 26, 27 and 28, which are under the control of two voltage responsive relays 29 and 30.

The operating coil 31 of relay 30 is connected through an adjusting resistance 32 and conductors 33 and 34 across electrodes 1 and 2 so as to be responsive to the voltage between these electrodes. By adjusting the amount of resistance 32 in series with the operating coil 31 of relay 30, or by adjusting the tension of its spring 35 a circuit will be completed through contacts 36 and 37 when the voltage between electrodes 1 and 2 exceeds a predetermined value and a circuit will be completed through contacts 37 and 38 when the voltage between electrodes 1 and 2 is less than a predetermined value.

The coils of relay 29 are connected across the electrodes and the work. The coil 39 is connected through conductors 34 and 40 so as to be responsive to the voltage between electrode 1 and the work, and coil 41 of relay 29 is connected through conductors 33 and 42 and conductor 40 so as to be responsive to the voltage between electrode 2 and the work. Adjustable resistances 43 and 44 are connected in series with these coils for adjusting their energization to predetermine the relationship between the voltages between the electrodes 1 and 2 and the work 9. Contacts 45, 46 and 47 of relay 29 are normally closed. Contact 45 is movable about pivot 48, depending upon the relative energization of coils 39 and 41 and contacts 46 and 47 are spring supported for accommodating the movement of contact 45 toward them. The circuits through contacts 46 and 47 are interrupted by movement of contact 45 away from them.

My invention will be better understood from a consideration of the operation of the embodiment illustrated.

In order to initiate the welding operation the operator closes switch 5 and switch 68 if three-phase operation is desired. The closure of switch 5 completes a circuit through conductors 3 and 4 to electrodes 1 and 2 and also completes the control circuit through contacts 49 of switch 5. If the electrodes are separated from one another as illustrated in the drawing full open circuit voltage is applied thereto and coil 31 of relay 30 is sufficiently energized to complete a circuit through its contacts 36 and 37 as follows: from the source of supply 24, through conductor 50, contacts 37 and 36 of relay 30, conductor 51 operating coils 52 and 53 of switches 26 and 27, conductors 54 and 55, contacts 45, 46 and 47 of relay 29, conductors 56 and 57, contacts 49 of switch 5 and conductor 58 to the source of supply 24. The energization of the coils 52 and 53 of switches 26 and 27 causes these switches to close their contacts connecting the feed motors 16 and 17 in circuits including their field windings 21 and 23 as follows: From the source of supply 24 through conductors 50 and 59, the armatures of the feed motors, their fields 21 and 23, conductors 60 and 61, switches 26 and 27, conductors 62 and 57, contacts 49 of switch 5 and conductor 58 to the source of supply 24. When thus connected both feed motors operate in a direction to feed the electrodes toward one another and toward the work.

Upon the electrodes engaging one another the voltage between these electrodes decreases below the predetermined value for which the relay 30 is adjusted and its contacts 36 and 37 are opened and its contacts 37 and 38 closed, completing an operating circuit for switches 25 and 28 as follows: From source of supply 24 through conductor 50, contacts 37 and 38 of relay 30, conductor 63, coils 64 and 65 of switches 25 and 28, conductors 54 and 55, contacts 45, 46 and 47 of relay 29, conductors 56 and 57, contacts 49 of switch 5 and conductor 58 to the source of supply 24. This completes a circuit through the field windings 20 and 22 of feed motors 16 and 17 as follows: From source of supply 24 through conductors 50 and 59, the armatures of the feed motors 16 and 17, their fields 20 and 22, conductors 66 and 67, switches 25 and 28, conductors 62 and 57, contacts 49 of switch 5, and conductor 58 to the source of supply 24. With this connection the feed motors 16 and 17 rotate in a direction to separate the electrodes from one another and the work.

Upon the separation of the electrodes an arc is established between them which causes the switches 11 and 12 to operate, connecting the work 9 in the polyphase welding circuit. If the voltage between electrodes 1 and 2 and the work have the predetermined relationship determined by the adjustment of resistances 43 and 44, contacts 45, 46 and 47 of relay 29 will remain closed, but if the voltage between electrode 2 and the work 9 attains a value greater than that determined by this adjustment, coil 41 is sufficiently energized to overcome the action of coil 39 and swing contact 45 out of engagement with contact 47 thereby interrupting the control circuit through its contacts. If contacts 37 and 38 of relay 30 are in their closed position, so as normally to complete the energization of the operating coils 64 and 65 of switches 25 and 28 the opening of contacts 45 and 47 of relay 29 will deenergize coil 65 of switch 28 and prohibit feed motor 17 from withdrawing electrode 2 further from the work until the voltage between this electrode and the work bears the predetermined relationship to the voltage between electrode 1 and the work determined by the adjustment of resistance 43 and 44 in circuit with the operating coils 39 and 41 of relay 29. Likewise, if coil 31 of relay 30 is sufficiently energized to complete a control circuit through its contacts 36 and 37 to close switches 26 and 27 in the feed motor circuit to operate these motors in a direction to feed the electrodes toward one another and the work, the operation of feed motor 16 will be prohibited by the opening of the control circuit at contacts 45 and 47 of relay 29 to prohibit the feeding of electrode 1 toward the work by its motor 16 until the voltage relationship between electrodes 1 and 2 and the work attains a predetermined relationship determined by the adjustment of relay 29.

A similar operation occurs upon an opposite unbalance in which contacts 45 and 46 of relay 29 are opened. Ordinarily relay 29 is adjusted for maintaining equal voltages between the several electrodes and the work. With such an adjustment if the voltage between one electrode and the work is greater than the voltage between another electrode and the work, the opening of the contacts of the differential relay 29 prevents the feed motor associated with that electrode from increasing its voltage and prevents the feed motor associated with the other electrode from decreasing its voltage. Thus a balance of voltages will eventually occur for relay 30 is continually vibrating and causing first one feed motor and then the other to operate during the welding operation. With an adjustment for balanced voltages between the electrodes and the work, the magnitude of the voltage may be determined by adjusting the electrodes as a unit and the work relatively to one another.

In the arrangement illustrated a three phase source of power has been shown. It is to be understood, however, that my invention is applicable to other polyphase arrangements than the one illustrated in which the work is connected in one of the phases of the polyphase source. My invention is also applicable to single phase welding circuits in which the arc established between the electrodes is maintained in contact with the work during the welding operation. When operating in this manner there is a voltage between each electrode and the work which varies as the distance between the electrodes and the work varies. The three phase system illustrated and described above may be made to operate as a single phase system by opening switch 68 in the conductor connecting the work 9 to one of the phases of the welding transformer. With switch 68 in its open position the system will function as described above when operated with the arc between electrodes 1 and 2 in contact with the work. Apparatus for automatically controlling the position of the arcing terminals of a plurality of electrodes relative to the work when said electrodes are connected in a welding circuit independently of the work for performing a welding operation in which the welding arc is maintained in contact with the work is described and claimed in the application of Ralph A. Gilbert, whose application, Serial No. 618,445 for Welding apparatus filed concurrently herewith and assigned to the same assignee as the present case.

It will be noted that the switching arrangement illustrated in the above described arrangement operates when opened to deenergize the windings of the relays 29 and 30. Other arrangements may be provided for accomplishing this purpose and although in the illustrated arrangement no means are provided for disconnecting the transformer winding 7 from the source of supply 8, suitable means may be provided for this purpose without departing from my invention.

Although I have described my invention as applied to a welding system, it is to be understood that it is also applicable to other systems in which a plurality of movable electrodes are adjusted relatively to one another and a fixed electrode and the voltages between the movable electrodes and the fixed electrode are determined by selectively controlling the feeding means associated with them.

What I claim as new and desire to secure by Letters Patent of the United States, is:—

1. Apparatus for welding with an arc maintained between a plurality of electrodes and in contact with the work to be welded comprising means for supplying arc sustaining current to said electrodes, means for maintaining a predetermined voltage between said electrodes, and means for maintaining a predetermined relationship between the voltages between said electrodes and the work.

2. Arc welding apparatus comprising a plurality of electrodes, means for connecting said electrodes and the work in a polyphase welding circuit, means for maintaining a predetermined voltage between said electrodes, and means for maintaining a predetermined relationship between the voltages between said electrodes and the work.

3. Arc welding apparatus comprising a plurality of electrodes, means for connecting said electrodes and the work in a polyphase welding circuit, means for maintaining a predetermined voltage between said electrodes and means for maintaining a balanced voltage between said electrodes and the work.

4. Apparatus for welding with an arc established between a plurality of electrodes and in contact with the work comprising means for connecting said electrodes in a welding circuit, means responsive to the voltage between said electrodes for independently and simultaneously feeding said electrodes toward and away from one another and the work to maintain a predetermined voltage between said electrodes, and means responsive to the voltages between each of said electrodes and the work for selectively controlling said feeding means to maintain a predetermined relationship between the voltages between said electrodes and the work.

5. A welding system comprising a plurality of electrodes, means for connecting said electrodes and the work in a polyphase circuit, means responsive to the voltage between said electrodes for independently and simultaneously feeding said electrodes toward and away from one another and the work to maintain a predetermined voltage between said electrodes, and means responsive to the voltages between each of said electrodes and the work for selectively controlling said feeding means to equalize the voltages between said electrodes and the work.

6. A welding system comprising a plurality of electrodes, means for connecting said electrodes and the work in a polyphase welding circuit, means for simultaneously feeding said electrodes toward one another and the work upon an increase in voltage between said electrodes above a predetermined value and away from one another and the work upon a decrease of voltage between said electrodes below a predetermined value, and means responsive to the voltages between said electrodes and the work for prohibiting the feeding of an electrode toward the work if the voltage between that electrode and the work is less than the voltage between another electrode and the work and for prohibiting the feeding of an electrode away from the work if the voltage between that electrode and the work is greater than the voltage between another electrode and the work.

7. Welding apparatus in which a polyphase arc is established between a plurality of electrodes and the work comprising means for feeding said electrodes toward one another and the work upon an increase in voltage between said electrodes above a predetermined value and away from one another and the work upon a decrease of the voltage below a predetermined value, means for connecting said work into the welding circuit upon the establishment of an arc between said electrodes, and means responsive to the voltages between said electrodes and the work for prohibiting the feeding of an electrode toward the work if the voltage between that electrode and the work is less than the voltage between another electrode and the work, and for prohibiting the feeding of an electrode away from the work if the voltage between that electrode and the work is greater than the voltage between another electrode and the work.

8. Welding apparatus in which a polyphase arc is established between a plurality of electrodes and the work comprising means for establishing an arc between said electrodes, and means for connecting the work into the welding circuit upon the establishment of an arc between said electrodes.

9. Means for maintaining an arc between a plurality of movable electrodes and a fixed electrode comprising means for supplying arc sustaining current to said electrodes, means responsive to the voltage between said movable electrodes for independently feeding said electrodes toward and away from one another and said fixed electrode to maintain a predetermined voltage between the said movable electrodes, and means responsive to the voltages between each of said movable electrodes and said fixed electrode for selectively controlling said feeding means to establish a predetermined relationship between the voltages between said movable electrodes and said fixed electrode.

10. Means for maintaining an arc between a plurality of movable electrodes and a fixed electrode comprising means for supplying arc sustaining current to said electrodes, means responsive to the voltage between said movable electrodes for independently feeding said electrodes toward and away from one another and said fixed electrode to maintain a predetermined voltage between the said movable electrodes, and means responsive to the voltages between each of said movable electrodes and said fixed electrode for selectively controlling said feeding means to equalize the voltages between said movable electrodes and said fixed electrode.

JAMES T. CATLETT.